US011009420B2

(12) United States Patent
Demuth et al.

(10) Patent No.: US 11,009,420 B2
(45) Date of Patent: May 18, 2021

(54) MEASURING DEVICE

(71) Applicant: WIKA Alexander Wiegand SE & Co. KG, Klingenberg (DE)

(72) Inventors: Ulrich Demuth, Erbach (DE); Peter Bretz, Buergstadt (DE); Markus Diener, Elsenfeld (DE); Thomas Rothenbach, Buergstadt (DE)

(73) Assignee: WIKA Alexander Wiegand SE & Co. KG, Klingenberg/Main (DE)

( * ) Notice: Subject to any disclaimer, the term of this patent is extended or adjusted under 35 U.S.C. 154(b) by 357 days.

(21) Appl. No.: 15/977,613

(22) Filed: May 11, 2018

(65) Prior Publication Data

US 2018/0328805 A1  Nov. 15, 2018

(30) Foreign Application Priority Data

May 11, 2017 (DE) ..................... 10 2017 004 880.0

(51) Int. Cl.
*G01L 19/14* (2006.01)
*G01L 19/10* (2006.01)
*G01L 19/12* (2006.01)
*G01L 19/00* (2006.01)

(52) U.S. Cl.
CPC ............ *G01L 19/143* (2013.01); *G01L 19/10* (2013.01); *G01L 19/12* (2013.01); *G01L 19/0092* (2013.01)

(58) Field of Classification Search
CPC ..... G01L 19/0092; G01L 19/10; G01L 19/12; G01L 19/143; G01D 11/24; G01D 11/245; G01G 21/28
See application file for complete search history.

(56) References Cited

U.S. PATENT DOCUMENTS

| 5,294,930 A | * | 3/1994 | Li | G01S 13/003 244/3.12 |
| 5,570,688 A | * | 11/1996 | Cochran | A62B 9/006 128/201.27 |
| 6,062,095 A | * | 5/2000 | Mulrooney | G01D 11/24 73/204.22 |

(Continued)

FOREIGN PATENT DOCUMENTS

| CN | 2157507 Y | * | 2/1994 |
| CN | 206004706 U | * | 3/2017 |

(Continued)

*Primary Examiner* — John Fitzgerald
*Assistant Examiner* — Truong D Phan
(74) *Attorney, Agent, or Firm* — Muncy, Geissler, Olds & Lowe, P.C.

(57) ABSTRACT

A housing for a measuring device for accommodating a transmission unit for transmitting data, and/or display unit for the readout of data, and a terminal unit provided for supplying electric power to the measuring device, having at least two housing compartments, wherein the transmission unit and/or the display unit and the terminal unit can each be arranged in different housing compartments, and axes of the housing compartments formed in each case by a surface normal of an outward facing housing opening of a housing compartment, or axes formed in each case by a surface normal of the cap closing the housing openings, cross one another. A measuring device is also provided that includes the housing, and a transmission and analysis system that includes such a measuring device.

22 Claims, 11 Drawing Sheets

(56) References Cited

U.S. PATENT DOCUMENTS

| | | | |
|---|---|---|---|
| 6,760,884 B1* | 7/2004 | Vertelney | G06F 40/131 715/202 |
| 9,448,140 B2 | 9/2016 | Ulrich et al. | |
| 2007/0145137 A1* | 6/2007 | Mrowiec | G06F 19/00 235/462.01 |
| 2010/0327063 A1* | 12/2010 | Medina | A61B 5/1495 235/454 |
| 2011/0266339 A1* | 11/2011 | Yach | G06Q 10/10 235/375 |
| 2011/0309931 A1* | 12/2011 | Rose | G06Q 10/08 340/539.13 |
| 2012/0118628 A1* | 5/2012 | Pakula | H04M 1/0266 174/520 |
| 2013/0249534 A1* | 9/2013 | Matt | G01D 11/24 324/156 |
| 2014/0110468 A1* | 4/2014 | Kandregula | G06K 7/1447 235/375 |
| 2015/0379463 A1* | 12/2015 | Sarangi | G06Q 30/0633 705/28 |
| 2016/0169855 A1* | 6/2016 | Baity | G01N 33/24 47/58.1 SC |
| 2016/0247115 A1* | 8/2016 | Pons | G06K 7/1413 |
| 2017/0092109 A1* | 3/2017 | Trundle | G16H 40/20 |
| 2017/0205827 A1* | 7/2017 | Rezvani | B64C 39/024 |
| 2017/0247108 A1* | 8/2017 | Ljubuncic | G06K 9/2063 |
| 2018/0002017 A1* | 1/2018 | Abeles | B64F 5/60 |
| 2018/0096541 A1* | 4/2018 | O'Brien | G06K 9/00637 |
| 2018/0247092 A1* | 8/2018 | Khojastepour | G01S 11/06 |
| 2018/0302781 A1* | 10/2018 | Lee | H04W 12/0609 |
| 2019/0122455 A1* | 4/2019 | Howard | G05D 1/102 |
| 2019/0344755 A1* | 11/2019 | Muller | B60R 25/102 |

FOREIGN PATENT DOCUMENTS

| | | | | |
|---|---|---|---|---|
| DE | 10126654 A1 * | 12/2002 | | G01F 23/263 |
| DE | 10 2012 019 616 A1 | 4/2014 | | |

* cited by examiner

MEASURING DEVICE

This nonprofessional application claims priority under 35 U.S.C. § 119(a) to German Patent Application No. DE 10 2017 004 880.0, which was filed in Germany on May 11, 2017, and which is herein incorporated by reference.

BACKGROUND OF THE INVENTION

Field of the Invention

The present invention relates to a housing for a measuring device, in particular for a so-called transmitter. The invention additionally relates to a measuring device and a transmission and analysis system.

Description of the Background Art

A transmitter is a measuring device that analyzes a physical quantity, as for example pressure, temperature, fill level (often also referred to as level), or flow rate, by means of a sensor system, displays the quantity, and/or transmits it to a control room as a measured value, output signal.

Such measuring devices are protected by robust housings that include a sensor system, analysis electronics, a terminal compartment, and a display with a control unit and an optional keypad input field. The sensor system here can also be located remotely from the housing as a separate component at or in a process.

It is also possible to use such measuring devices with their housing remotely from a measuring point as a signal transmitter or converter with a display function.

Such a measuring device is disclosed in, for example, DE 10 2012 019 616 A1, which corresponds to U.S. Pat. No. 9,448,140, which is incorporated herein by reference. Here, an analysis unit for a physical quantity is described that includes a housing with a sealed measuring connection, a sealed cable feed-through for supplying electrical power to the analysis unit, and analysis electronics positioned in the housing. The housing has an axis of symmetry and a closable opening that is provided with a sealed cover having a window. In addition, a configurable display unit for displaying a measured value is provided that has a central viewing axis. The axis of symmetry of the housing and the central viewing axis are crossed in this design.

Furthermore, such transmitters can be equipped with radio technology or other wireless transmission technology that is used for data transmission or for locating functions. The transmitter is then part of a transmission and analysis system, for example.

SUMMARY OF THE INVENTION

It is therefore an object of the invention to provide a housing for a measuring device that is improved over the prior art, an improved measuring device, and a transmission and analysis system.

The housing according to an exemplary embodiment of the invention for a measuring device for accommodating a transmission unit for transmitting data and/or a display unit for displaying data and a terminal unit provided for supplying electric power to the measuring device includes at least two housing compartments, wherein the transmission unit and/or display unit and the terminal unit can each be arranged separately in different housing compartments. Axes of the housing compartments formed in each case by a surface normal of an outward facing housing opening of a housing compartment, or axes formed in each case by a surface normal of the cap closing the housing openings, are designed to cross one another. In other words, axes of orientations of the housing compartments cross one another.

Because of the design of the housing, the measuring device that is designed, in particular, as a transmitter can be manufactured at low cost, and at the same time enables good readability of the display unit in different installation positions because of the crossing of the housing compartments. In addition, good operability and accessibility for a terminal area of the terminal unit is made possible.

Because of the design with at least two housing compartments or chambers, the display unit and/or transmission unit and the terminal unit can be arranged separately and are interchangeable, so that the measuring device can be adapted easily to different applications and different desired reading directions.

The transmission unit in this context is, for example, an interface for wired or wireless data transmission. For wireless data transmission, the transmission unit is, e.g., a radio unit for sending and/or receiving radio signals, an infrared unit for sending and/or receiving infrared signals, or a light signal unit for sending and/or receiving light signals.

When the transmission unit is designed as a light signal unit, a transmission of the data takes place, for example, such that the data is transmitted on the basis of light signals by means of a light source and is detected by means of a light sensor. To this end, the light signal unit includes, in particular, at least one light source and one light sensor.

The data transmitted by means of the transmission unit and/or displayed by means of the display unit includes, for example, of measured values detected by means of the measuring device, status data of the measuring device, location or position information of the measuring device, data describing a configuration of the measuring device, and/or command data for the measuring device or from it.

The housing compartments can be separated from one another by means of at least one partition or separator. The partition or separator is, e.g., continuous in design, has a cutout for cable feed-throughs or a cutout with a covering. For example, the partition, separator, or covering includes means for a gas-tight feed-through of electrical contacts so that the housing compartments are separated from one another in a gas-tight manner but have an electrical connection. In this design, the housing compartments are hermetically separated from one another, for example, so that an explosion-proof housing can be realized in a simple manner.

An additional housing compartment can be provided that is provided to accommodate a sensor analysis element. It is also possible that this sensor analysis element is integrated in the same housing compartment with the terminal unit or in connected housing compartments in the measuring device. In one possible implementation, this additional housing compartment is also separated from the other two housing compartments in a gas-tight manner or hermetically, or is hermetically separated together with the housing compartment for the terminal unit from the housing compartment for the display unit, so that an explosion-proof housing can be achieved in a simple way.

The crossing can be 20° to 50°, in particular 25° to 45°, in particular 20° to 35°. Such values of the crossing make possible especially good readability of the display unit simultaneously with especially good operability and accessibility for the terminal area of the terminal unit.

The housing compartments each can include fastening elements for fastening the display unit and the terminal unit, wherein at least the two fastening elements in the two housing compartments are of identical design. In particular, the two fastening elements are located at the same geometric spacing or are arranged in the same manner with regard to their position in the housing compartment, so that in each case an installable unit can be fastened with the same fastener in the same positions in either one chamber or the other chamber. These fastener are, for example, screw locations, screw elements, mounting surfaces, or latching elements onto which components can be positioned and fastened. This makes it possible by simple means that the display unit and the terminal unit can be located in the two housing compartments in alternation depending on the requirements of the application.

At least one of the caps can have a window with a thickness of at least 5 mm, in particular at least 8 mm, or at least 10 mm. The window permits viewing of a display of the display unit and, in combination with the cap, efficaciously protects it from mechanical and chemical influences in the environment. At the same time, explosion protection can be realized due to the window thickness of at least 5 mm, wherein bursting of the window is avoided in the event that an explosion occurs inside the housing, and the explosion thus does not reach the outside.

At least two housing compartments can be coupled to a base provided for measuring device mounting, and are rotatable through at least 260°, in particular at least 300°, about the base. The readability of the display unit and the operability and accessibility of the terminal area can be improved further by means of the rotatability of the housing compartments.

The housing can have at least two connection openings and/or at least two cable entry openings. This simplifies the alternating arrangement and the connection of the display unit and connection unit in the two housing compartments as a function of application requirements. In particular, it is also possible by simple means to loop cables of a bus system in and out to neighboring measuring devices.

The connection openings and/or cable entry openings can each be located in a lower housing region. In this way, especially when conduit is used for cable routing, which is to say when a conduit is connected to the housing, the ingress of water into the housing from the top can be prevented in the event of a leak in the connection openings and/or cable entry openings.

The connection openings and/or cable entry openings can be located in one plane, by which means the looping of cables in and out is further simplified.

The connection openings and/or cable entry openings can be equipped to accommodate at least one radio antenna for transmitting data to other devices, for example measuring devices, analysis units and storage units. The radio antenna is, for example, a part of the transmission unit designed as a radio unit, or at least is coupled thereto.

The radio antenna can be part of at least one of the caps or of another cover or of the housing itself. The radio antenna is, for example, a metal part that is integrated into a cap or cover at least partially made of plastic. Optionally, flat or window antennas, which is to say integrated metallization sections as part of the window or as part of the housing, are also possible.

The measuring device according to the invention comprises an aforementioned housing, at least one display unit and/or at least one transmission unit for sending and/or receiving a signal and at least one connection unit, wherein the display unit and/or transmission unit and the terminal unit are each arranged in different housing compartments, for example separately from one another.

Because of the design of the housing, the measuring device that is designed, in particular, as a transmitter can be manufactured at low cost, and at the same time enables good readability of the display unit in different installation positions because of the crossing of the housing compartments. In addition, good operability and accessibility for a terminal area of the terminal unit is made possible.

Because of the design with at least two, for example separate, housing compartments or chambers, the display unit and the terminal unit can be arranged separately and are interchangeable, so that the measuring device can be adapted easily to different applications and different desired reading directions.

On the basis of the signal sent and/or received by means of the transmission unit, a position finding of a measuring device, for example, and/or a transmission of information from the measuring device to a receiver is possible.

The transmission unit in this context is an interface for wired or wireless data transmission, for example. For wireless data transmission the transmission unit is, e.g., a radio unit for sending and/or receiving radio signals, an infrared unit for sending and/or receiving infrared signals, or a light signal unit for sending and/or receiving light signals.

When the transmission unit is designed as a light signal unit, a transmission of the data takes place, for example, such that the data is transmitted on the basis of light signals by means of a light source and is detected by means of a light sensor. To this end, the light signal unit includes, in particular, at least one light source and one light sensor. For example, a pulsed light signal is emitted by means of the light signal unit. A user or operator can detect this light signal by means of a light sensor of a mobile terminal device, for example a camera of a smartphone or tablet computer, and can analyze and output this signal by means of an application program, also called an app, stored on the mobile terminal device. It is also possible for the user or operator to transmit a light signal to the measuring device by means of a light source of the mobile terminal device, with the light signal being detected by the light sensor of the transmission unit.

The data transmitted by means of the transmission unit and/or displayed by means of the display unit includes, for example, of measured values detected by means of the measuring device, status data of the measuring device, location or position information of the measuring device, data describing a configuration of the measuring device, and/or command data for the measuring device or from it.

In an embodiment of the measuring device, the device includes at least one sensor for detecting a pressure, a temperature, and/or a fill level.

In an embodiment of the measuring device, the device includes at least one button unit that is or can be arranged outside the housing, wherein the button unit includes multiple buttons with integrated magnets, and a stroke operation of a button can be transmitted to the display unit or to an assembly associated with the display unit by means of a shifted magnetic field. By means of a button unit of this nature, which is recessed into a so-called pocket in the housing, for example, the display unit can be operated from outside even through a wall of the housing without the need for an opening of the measuring device.

In an embodiment of the measuring device, the display unit includes an illuminated display, wherein an activation of the illumination occurs automatically upon detection of acoustic signals, optical signals, haptic signals, actuation of a button, and/or the reaching or the crossing of a stored threshold value. As a result, it is possible to achieve in a simple way that the illumination is only active when reading of measured values is taking place at the display unit. As a result, energy consumption can be minimized on the one hand, and the service life of an illuminating means can be maximized on the other hand.

In an embodiment of the measuring device makes provision that an optoelectronically readable text is implemented on an outward-facing surface of at least one of the caps, wherein the optoelectronically readable text includes an address for creating a data connection to a data memory from which measured values detected by the measuring device can be retrieved. As a result, it is possible in an especially simple and convenient way to retrieve the measured values from the data memory, for example a so-called back end server or a so-called cloud, by means of a terminal device, for example a mobile terminal device such as a smartphone or tablet computer, or a stationary terminal device.

In addition, provision is made in an embodiment of the measuring device that it includes the data transmission device instead of the display unit. A measuring device of this nature designed as a transmitter is designed to transmit data or measured values over radio with the aid of a transmission protocol. This can take place in parallel with a transmission of the measured values through wires. In this design, the measuring device communicates through two different, mutually independent paths with one receiving location or multiple receiving locations.

To optimize data transmission and/or energy consumption of the measuring device, provision is made for example to optimize, e.g., latencies in the data transmission in that data concerning certain states is provided and/or held ready on a server for transmission instead of in the measuring device itself. Thus, a message "tank empty" can be triggered when a measured value is detected and/or a value falls below a threshold value, wherein the measured value then triggers data transmission of a prepared message on the server. In this way it is possible to keep data packets in the network of the measuring devices small.

In order to reduce an energy consumption of the measuring device, it is possible to regularly or cyclically place it in idle states, also known as "sleep mode." In this design, for example, a cycle time is provided with an on/off timing of milliseconds or even nanoseconds is possible, hence for example 40 ns "on" and 140 ns "off" or for example 20 ms "on" and 500 ms "off," so that the measuring device has a low energy consumption in the range of a few microwatts. To achieve this, provision is made, for example, to buffer a power supply of the measuring device with a rechargeable battery and/or a capacitor. Furthermore, a primary battery, a button cell, or any other energy storage device is possible in place of the rechargeable battery. In one possible implementation of the measuring device, the device is supplied with power through wires and/or using a rechargeable battery built into the measuring device.

For example, a receiving location is a control unit or an intermediate distributor, router, proxy server, or another measuring device of a network of measuring points or actuators. For example, the transmission unit of the measuring device and/or a transmitter unit of the data memory and/or data transmission device are or is equipped for emission that is directional, and hence optimized for transmission.

Furthermore, a receiving location or a communication partner can be implemented as a mobile terminal device with so-called IoT or Industry 4.0 connectivity. Examples of such a receiving location or communication partner are another measuring device, a higher-level unit, or another network participant, or are implemented as a smartphone, tablet or explosion-proof tablet, or explosion-proof smartphone.

In an embodiment, access and/or write privileges for the measuring device are governed through a server or through the measuring device itself. It is also possible for communication to take place through a so-called OPC UA interface or W3C API interface. Furthermore, it is possible for an associated operating manual to be downloaded through a radio connection to a server or the measuring device itself. Consequently, it is made possible, for example, to download an operating manual stored in the measuring device through a direct path as well. This is possible through a radio connection conforming to the IEEE 802.15.1 industry standard or any other radio standard.

Furthermore, provision can be made that communication with the measuring device takes place through an associated program, for example a software application (also called an application, or app for short), that is executed on the mobile terminal device. In this case, an optoelectronically readable text, for example a bar code or QR code and/or an RFID code, or other code, or an infrared or other light connection (including by means of a camera or flash on the terminal device, for example) can be used for identification or for establishing communication.

To this end, for example, various applications, options for geometric representation, and/or methods of processing measured values can be downloaded in a so-called app store and used. In this regard, applications for tracking a fill level, a temperature and/or a pressure in various vessels are provided, for example. For example, a fill level in round horizontal containers must be analyzed or displayed differently than in vertical vessels. Also, as a function of contents, various tracking or monitoring services can additionally be activated, as for example services for long-term tracking trends or even services for filling or refilling a vessel, wherein third parties can be incorporated here as service providers. Through such processes, refilling processes or other processes can be minimized or optimized.

This also finds application, for example, for refilling of heating oil, kerosene, gasoline, liquefied gases such as, e.g., oxygen and hydrogen, or other energy sources and media.

Especially in applications of this nature, a location or a position of the measuring device is of interest. With regard to data transmission, not only the location or position, but also a change in location or position, is of interest. It is possible in this regard to permanently store an item of location or position information in a measuring device.

To this end, provision is made that the measuring device designed as a transmitter is integrated into a transmission and analysis system.

The provision of documents and test certificates in conjunction with the measuring device represents another possible functionality. Thus, for example, such documents for the measuring device can be provided online on a server. Furthermore, it is possible that a user determines that a test certificate has expired and must be renewed, for which purpose he can select from a selection menu of stored suppliers for such a test directly through the app or program and issue an order, and in so doing take into account parameters such as price, distance, delivery time and the ability to provide tests or additional services for this measuring device. Furthermore, it is naturally also conceivable and possible that a supplier also immediately associates such services with the measuring device online and correspondingly uploads them to a server space reserved therefore, and thus makes them directly available to the user.

The deficiency of an expired test certificate or a fault in the device can, of course, also be reported to a user automatically or after a time period elapses; for this purpose, automatic notifications, so-called push messages, can be used, as for example a message via email, SMS, WhatsApp or other services.

The transmission and analysis system according to the invention comprises at least one aforementioned measuring device and at least one data memory and/or data transmission device, wherein the data memory and/or data transmission device is a mobile terminal device or an unmanned aircraft and includes at least one readout unit for reading out measured values detected by the measuring device. In particular, these units are connected via network connectivity and are connected to one another in a wired or wireless manner through a network protocol or are connected to other network participants and represent a subnet or a part of a network.

Readout and storage of the measured values is possible in a simple manner by means of the data memory and/or data transmission device. Especially when the data memory and/or data transmission device is designed as a mobile terminal device or as an unmanned aircraft, also called a drone, the readout can take place fully autonomously or at least under remote control, so that labor can be reduced. At the same time, the use of a drone of this nature permits an increase in reliability and convenience, since it can acquire the measured values even under adverse environmental conditions.

In an embodiment of the transmission and analysis system, the at least one measuring device transmits a radio signal by means of a transmission unit designed as a radio unit, wherein the data memory and/or data transmission device includes a locating unit for finding the position of the measuring device using the radio signal, and thus the measuring device can be located in a simple and reliable manner.

In an embodiment of the transmission and analysis system, so-called beacons, which is to say autonomous transmitter units whose transmitted signals are analyzed, are provided for position finding or as location aids. The beacons can be distributed in the periphery as a single assembly and serve as location markers for orienting sensors or drones. Otherwise, it is also possible for them to be replaceable units in the sensor housings. Moreover, beacon modules of this nature can also have an interface to a sensor or analysis unit, to the power supply, and/or for exchanging data such as, e.g., an association with a device, as well.

In an embodiment of the transmission and analysis system, this system includes a central computing unit, wherein the central computing unit is connected through a wireless communication connection to the data memory and/or data transmission device, an exchange of data takes place over the communication connection between the central computing unit and the data memory and/or data transmission device, and measured values detected by the measuring device can be read out and transmitted to the central computing unit by means of the data memory and/or data transmission device. This makes it possible in an especially simple and convenient manner to transmit the measured values to the central computing unit, for example a so-called back end server and to transmit data from the central computing unit to the measuring device.

In an embodiment of the transmission and analysis system, the central computing unit is coupled over an additional communication connection with at least one terminal device, wherein the at least one terminal device retrieves the measured values detected by the measuring device from the central computing unit through the additional communication connection. In this way, for example, it is made possible to retrieve the measured values from the central computing unit by means of the terminal device, for example a mobile terminal device such as a smartphone or tablet computer, or a stationary terminal device.

In an embodiment of the transmission and analysis system, the mobile terminal device approaches the measuring device, or the unmanned aircraft, i.e., the drone, approaches the measuring device, with satellite support and/or camera support and wirelessly receives data in a temporary memory and/or provides data from this memory.

To this end, the mobile terminal device or the drone includes, for example, satellite navigation and a camera system, by means of which an autonomous orientation of the same to environmental data, as for example buildings, roadway markings, are parallel thereto. Moreover, the mobile terminal device or the drone can include so-called direction-finding or direction orientation to stationary ground stations. In this case, an approach or a flight approach to a destination takes place in particular in such a manner that the drone first flies approximately into a destination area using satellite navigation, and once there approaches the destination with high accuracy by means of camera-assisted navigation and/or direction-finding.

In an embodiment of the transmission and analysis system, the data temporarily stored by the mobile terminal device or drone is wirelessly transmitted at a later time to a node, a database, a person and/or the central computing unit for relaying, analysis, storage, and/or display.

The following description relating to a drone is also applicable in an analogous fashion to a mobile terminal device, for example a smartphone or tablet computer. In other words, the functionalities described in the example of the drone can also be realized with other mobile terminal devices.

In an embodiment of the transmission and analysis system, the drone activates a data transmission from the measuring device to the drone in order to read out the measurement data of the measuring device by generating an energy field and/or using wireless communication. Alternatively, by emitting acoustic signals, optical signals, haptic signals, actuating a button, and/or initiating the reaching or the crossing of the stored threshold value, the drone causes the activation of the illumination of the display and reads the measured values by means of the camera system. The measured values received or read out here are stored in a memory unit belonging to the drone at least until they have been transmitted to an appropriate receiver.

To increase the range of the drone, the transmission and analysis system in another possible implementation thereof includes a multiplicity of energy storage devices, wherein the drone approaches a storage location of the energy storage devices and picks up and/or drops off at least one energy storage device. For example, charging stations of the energy storage devices are powered by means of renewable energy, for instance using photovoltaic systems, and/or through an energy grid, for example a public power grid. In particular, the charging stations have approach orientation markings, with the aid of which the drone can approach the charging stations very precisely. At the storage location, the drone is assigned, for example, a full energy storage device and a charging station and/or a deposit location for an energy storage device that is already at least partially emptied.

According to an embodiment of the transmission and analysis system, the at least one drone is designed such that it can charge an energy storage device of a measuring device. Charging of this nature takes place, for example, through buildup of an energy field, for example with the use of magnetic induction.

In an embodiment of the transmission and analysis system, the data memory and/or data transmission device includes at least one transmitter unit for transmitting position-finding data through a direct or indirect connection to the at least one measuring device, which permits simple and reliable position finding of the measuring device.

In an embodiment of the transmission and analysis system, the transmission of the position-finding data by the transmitter unit to the at least one measuring device takes place as a function of a distance between the data memory and/or data transmission device, in particular when the distance falls below a predetermined threshold value.

In an embodiment of the transmission and analysis system, the data memory and/or data transmission device generates and/or transmits the position-finding data on manual request or based on an automatic algorithm.

According to an embodiment of the transmission and analysis system, the data memory and/or data transmission device, for example the drone or the mobile terminal device, transmits position-finding data to the measuring device either on manual request or based on an automatic algorithm preprogrammed in the measuring device or automatically upon approach, thus, for example, by signal transmission to the measuring device, e.g., through a plug or cable in the case of direct connection or by a preprogrammed automatic algorithm in the measuring device that is only started by a request.

Thereafter, the measuring device holds the location information as long as it remains at this location.

In this design, detection of a change in location can also be carried out automatically by the measuring device, however, for example by means of a vibration sensor, on the basis of an extended interruption of a communication connection, or on the basis of a new approach or connection with devices that permit location determination. It is also possible here to retrieve a history of where the device comes from or where it was installed. This can be used in the context of service purposes, for example.

Locating data in this context can be geodata, e.g., on the basis of GPS, GLONASS, Galileo, or other systems that are defined in the form of so-called X/Y grid data. The locating data can also be present in the form of location-specific data, however, as for example, "WIKA company, Plant 1, Building 7, Room 144," or "HDPE Production, Process Unit 234A, High-pressure stage."

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
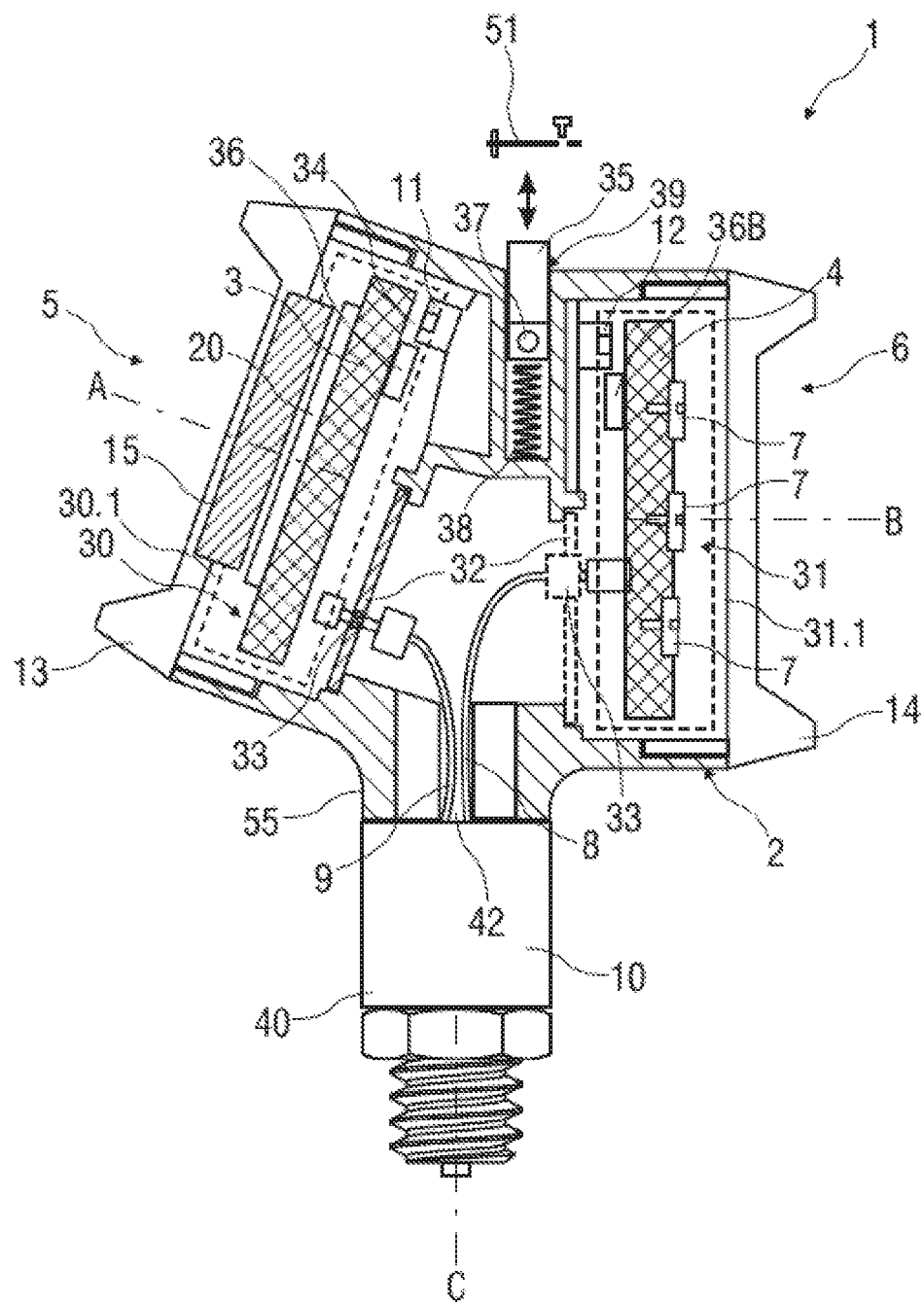
FIG. 1 schematically shows a sectional view of an exemplary embodiment of a measuring device.

Shown in FIG. 1 is a sectional view of one possible exemplary embodiment of a measuring device 1. In the exemplary embodiment shown, the measuring device 1 is designed as a so-called transmitter, and detects at least one physical quantity, as for example a pressure, a temperature, a fill level, or a flow rate of a system of a device, analyzes the at least one physical quantity by means of a sensor system, displays the at least one quantity, and/or transmits the at least one quantity to a control room.

The measuring device 1 includes a housing 2 for accommodating a display unit 3 for displaying measured values and a terminal unit 4 provided for supplying electric power to the measuring device 1.

The housing 2 includes two separate housing compartments 30, 31 or housing chambers, wherein the display unit 3 and the terminal unit 4 are each arranged in different housing compartments 30, 31. In this design, the housing 2 is, in particular, shaped in such a way that it can accommodate the display unit 3 equally well in the housing compartment 30 from a first side 6 as in the housing compartment 31 from a second side 5 opposite thereto.

The terminal unit 4 is installed and accommodated in the housing compartment 31, 30 facing away from the housing compartment 30, 31 that accommodates the display unit 3.

The terminal unit 4 includes a terminal block with screws 7, which establishes electrical contact to a higher-level unit, a control room, or a sensor.

In addition, the display unit 3 and the terminal unit 4 inside the housing 2 are connected by cables 8, 9 to an analysis unit 10 located in a lower housing compartment 40 or a lower subchamber in a housing base 55.

Figure 2:
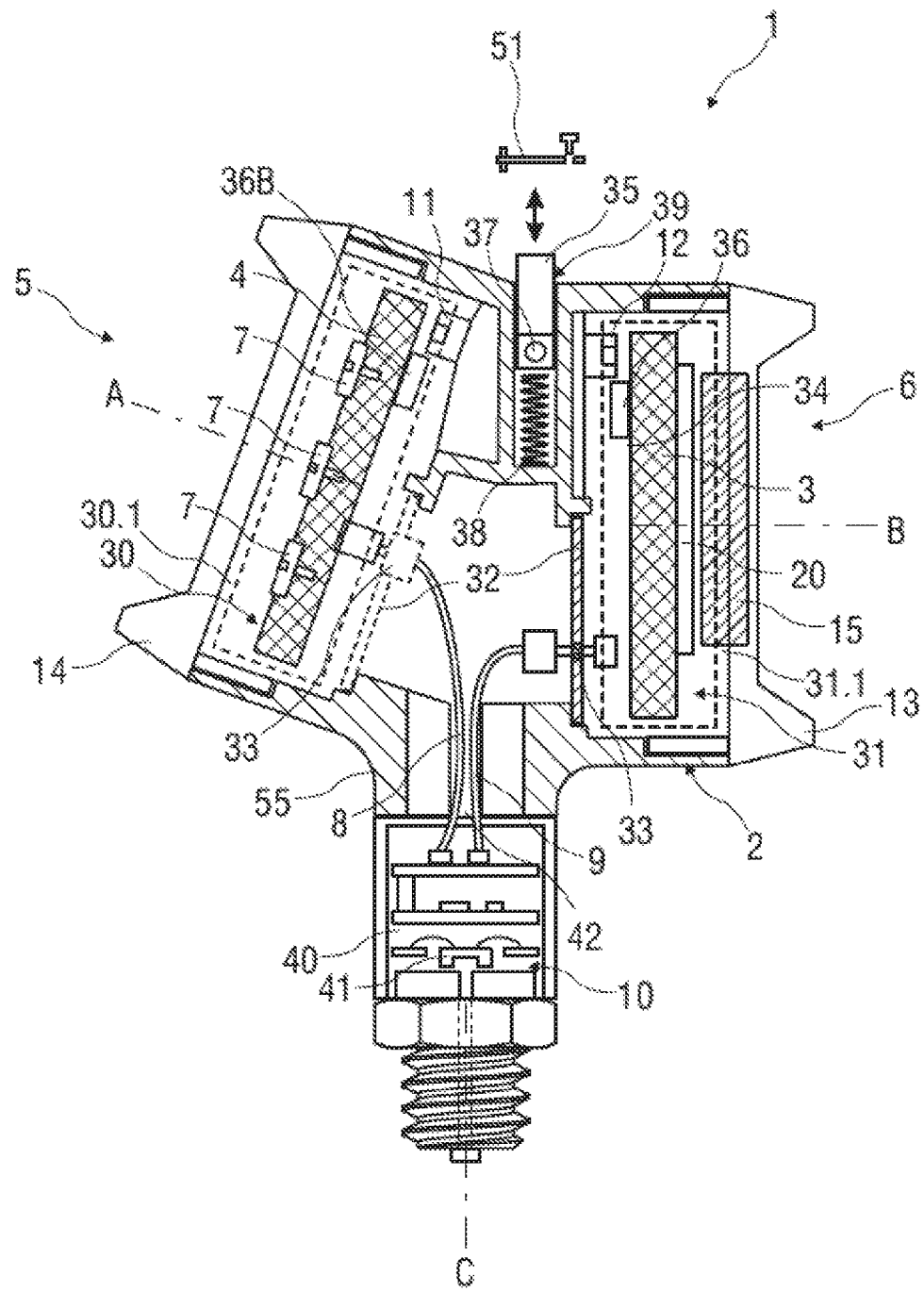
FIG. 2 schematically shows a sectional view of an exemplary embodiment of a measuring device.

The base 55, and thus the lower housing compartment 40, is arranged to be rotatable through at least 260°, in particular at least 300°, relative to the two upper housing chambers 30, 31, and contains the analysis unit 10 for sensor analysis of a sensor 41 shown in detail in FIG. 2, for example a pressure, temperature and/or fill level sensor. The lower housing compartment 40 in this design is connected to the housing compartment 31 in which the terminal unit 4 is located by an opening 42, for example a bore.

The two housing compartments 30, 31, and thus also the display unit 3 and terminal unit 4, are spatially separated by means of a partition 32. In this way, an explosion-proof measuring device 1 can be achieved, wherein in the event that an explosion occurs inside a housing compartment 30, 31, 40 a spread thereof to the remaining housing compartment 40, 31, 30 is avoided.

To achieve this explosion protection, a pressure-tight feed-through 33 for electrical lines, which is to say the cables 8, 9, is provided between the display unit 3 and analysis unit 10. The lines or cables 8, 9 are provided with plug contacts at both ends so that a conversion or an exchange of the display unit 3 and terminal unit 4 is easily possible.

For this purpose, plug-in bases, in particular, can be provided, that are identically constructed in both housing compartments 30, 31 on both sides 5, 6 in the measuring device 1. At a minimum, however, the display unit 3 is installed in combination with a plug-in base 34 from which the display unit 3 can be pulled out and can be placed and/or latched in different rotated positions, at least 4×90°.

The exchange of display unit 3 and terminal unit 4 can also be connected in this case with an exchange or a repositioning of the partition 32 with integrated pressure-tight feed-through 33 in the particular housing compartment 30, 31 associated with the display unit 3.

The housing 2 is additionally designed in such a manner that axes A, B of the housing compartments 30, 31 formed in each case by a surface normal of an outward facing housing opening 30.1, 31.1 of a housing compartment 30, 31, or axes A, B formed in each case by a surface normal of the cap 13, 14 closing the housing openings 30.1, 31.1, cross one another. The crossing is 20° to 50°, in particular 25° to 45°, in particular 20° to 35°.

As a result, the housing 2 has, in particular, a bend that results from an angle between the two axes A, B. In this design, different viewing axes for the two sides 5, 6 in relation to a mounting axis C result from the way the two axes A, B run. Here the viewing axis described by the axis B runs at an angle of 90° to the mounting axis C of the housing base 55. Good readability of the display unit 3 is possible in different installation positions of the measuring device 1 because of such a crossing of the housing compartments 30, 31. In addition, good operability and accessibility for a terminal area of the terminal unit 4 is made possible.

For an implementation of this nature, with an optional arrangement of the display unit 3 in one of the two upper housing compartments 30, 31 and the terminal unit 4 in the remaining housing compartment 31, 30, the housing compartments 30, 31 each include fastening elements 11, 12 for fastening the display unit 3 and the terminal unit 4, wherein all fastening elements 11, 12 in the two housing compartments 30, 31 are of identical design. In addition, receptacle geometries and screw positions associated with the fastening elements 11, 12, which is to say that correspond thereto, are provided on the display unit 3 and the terminal unit 4.

Each of the two housing compartments 30, 31 is closed with a cap 13, 14 implemented as a screw cap, wherein a cap 13 with window 15 is provided for the display unit 3, and a closed cap 14 is provided for the terminal unit 4.

The window 15 in this design has a thickness of at least 5 mm, in particular at least 8 mm or 10 mm, by which means bursting of the window 15 is avoided in the event that an explosion occurs inside the housing 2, and the explosion thus does not reach the outside.

The display unit 3 includes an outward-facing, flat display 20, which is illuminated, for example. An activation of the illumination occurs, for example automatically, upon detection of acoustic signals, optical signals, haptic signals, actuation of a button, and/or the reaching or the crossing of a stored threshold value. In one possible implementation, the activation of the illumination occurs automatically when a vibration sensor detects a certain tapping pattern of a user. This tapping function can be activated and deactivated. It is also possible to configure corresponding electronics such that the illumination is only activated when the sensor analysis reaches certain values or when vibration occurs.

The measuring device 1 additionally includes a button unit 39 that is or can be arranged outside the housing 2, wherein the button unit 39 includes multiple buttons 35, each spring-mounted by its own spring 38, with integrated magnets 37, and a stroke operation of a button 35 can be transmitted to the display unit 3 or to an assembly associated with the display unit 3 by means of a shifted magnetic field. The transmission here occurs to reed switches 36 of the display unit 3, for example. Alternatively or in addition, at least one reed switch 36B can also be part of an intelligent terminal unit 4 and be operated.

The button unit 39 is, for example, recessed into a so-called pocket in the housing on a top of the housing 2, and permits operation of the display unit 3 even from outside through walls of the housing 2 without it being necessary for the housing 2 to be opened.

The button unit 39 can be sealed and closed from the outside by a cover 51. In this context, the cover 51 is designed to be hinged in one possible implementation. In another possible implementation, the cover 51 in a hinged embodiment is designed to be reflective or polished on an inner side so that a labeling and/or an icon can even be read from the front using the mirror.

In one possible implementation of the measuring device 1, the button unit 39 can be installed as a plastic insert and/or screwed to the housing. Depending on the design of the housing 2, the installation takes place along or transverse to the axes A, B.

In another possible implementation of the measuring device 1, the cover 51 of the button unit 39 is on an outward-facing surface provided with an optoelectronically readable text that can be read by a data memory and/or data transmission device that is designed as a mobile terminal device or unmanned aircraft and includes at least one readout unit for reading out measured values detected by the measuring device 1. Alternatively or in addition, the measuring device 1 includes, in a manner that is not shown in detail, a transmission unit designed as a radio unit for sending and/or for receiving a radio signal by means of which the measuring device 1 can be located by the data memory and/or data transmission device.

Above and beyond the position finding of the measuring device 1, it is possible to link special services, in particular, with the readout of the optoelectronically readable text and/or the reception of the radio signal, so that a retrieval of measured values of the measuring device 1 can take place directly to the data memory and/or data transmission device through the radio connection, or an address for establishing a data connection to a data memory is made possible for the data memory and/or data transmission device by readout of the optoelectronically readable text and/or of the radio signal, wherein in this case the data memory and/or data transmission device can retrieve from the data memory, for example a web server, measured values that have been detected by means of the measuring device 1 and transmitted to the data memory.

Such special services can also be realized by calling up a web address on a mobile terminal device, for example a smartphone, or by an appropriate application program, also referred to as an application (app for short), that outputs measured values to an end user.

In one possible implementation of the measuring device 1, an optoelectronically readable text is implemented on an outward-facing surface of at least one of the caps 13, 14, wherein the optoelectronically readable text includes an address for creating a data connection to a data memory from which measured values detected by the measuring device 1 can be retrieved.

FIG. 2 shows a sectional view of another possible exemplary embodiment of a measuring device 1.

In contrast to the exemplary embodiment of the measuring device 1 shown in FIG. 1, the terminal unit 4 and the display unit 3 with partition 32 and pressure-tight feed-through 33 are shown in swapped positions in the exemplary embodiment from FIG. 2.

This means that the display unit 3 with partition 32 and pressure-tight feed-through 33 is located in the housing compartment 31, and the terminal unit 4 is located in the housing compartment 30.

Furthermore, the depiction in FIG. 2 shows the measuring device 1 in the area of the analysis unit 10 in a cross-section as well, wherein the analysis unit 10 includes a sensor 41 implemented as a pressure sensor, for example.

Figure 3:
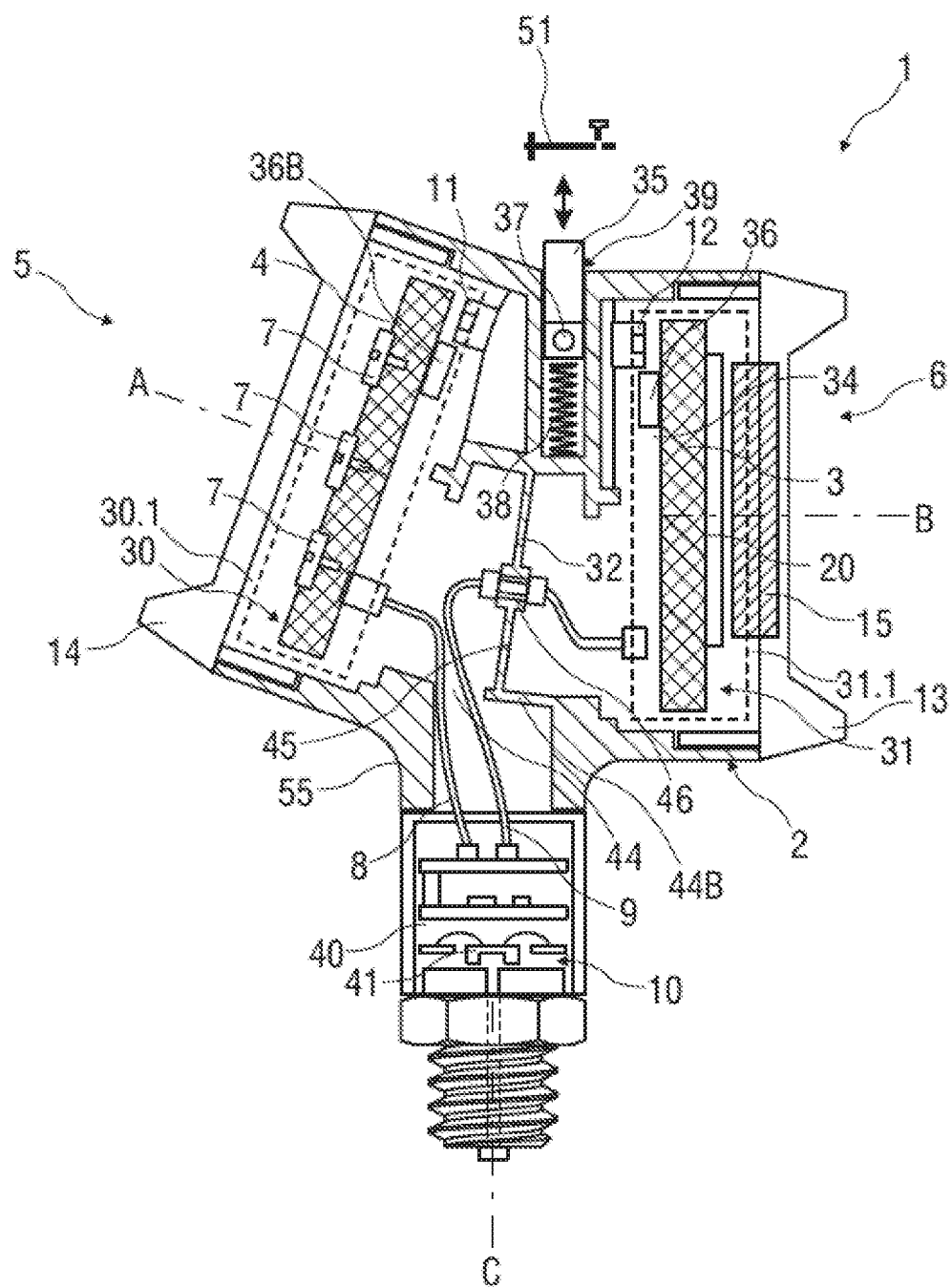
FIG. 3 schematically shows a sectional view of an exemplary embodiment of a measuring device.

In FIG. 3, a sectional view of another possible exemplary embodiment of a measuring device 1 is shown.

In contrast to the exemplary embodiment of the measuring device 1 shown in FIG. 2, a fixed partition 45 with integrated pressure-tight electrical feed-through 46 is implemented in the exemplary embodiment shown in FIG. 3, wherein the cables 8, 9 are routed through an opening 44 to the analysis unit 10 in the additional housing compartment 40.

In the event display unit 3 and terminal unit 4 exchange positions, the housing walls closing off the openings 44, 44B are opened, for example through boring, or are closed by means of a gas-tight and pressure-tight seal element.

Figure 4:
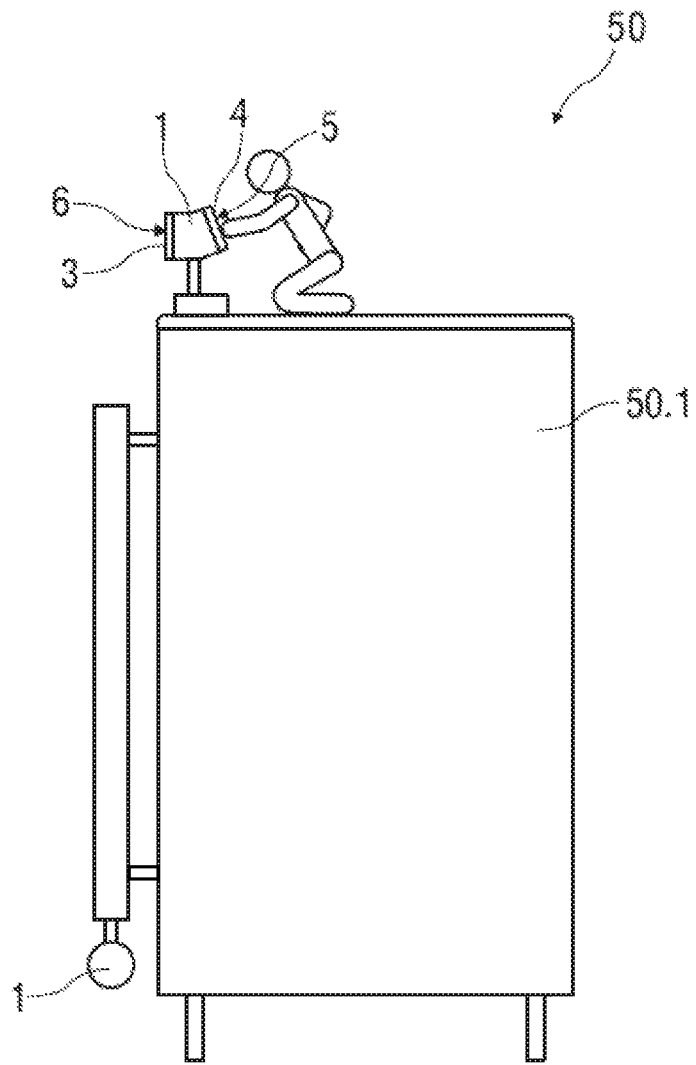
FIG. 4 schematically shows a sectional view of an apparatus with a measuring device.

FIG. 4 shows a sectional view of an apparatus 50 with a measuring device 1 according to one of the exemplary embodiments shown in FIGS. 1 to 3, wherein the apparatus 50 includes a tank 50.1, and the measuring device 1 detects at least one physical quantity present in the interior of the tank 50.1.

Here, the display unit 3 is located on the "straight" side 6 in the housing compartment 31 and the terminal unit 4 us on the "angled" side 5 in the housing compartment 30. Consequently, good readability of the display unit 3 and at the same time easier access to a terminal compartment of the terminal unit 4 are possible.

An additional measuring device 1 is located in the lower region of the tank 50.1.

Figure 5:
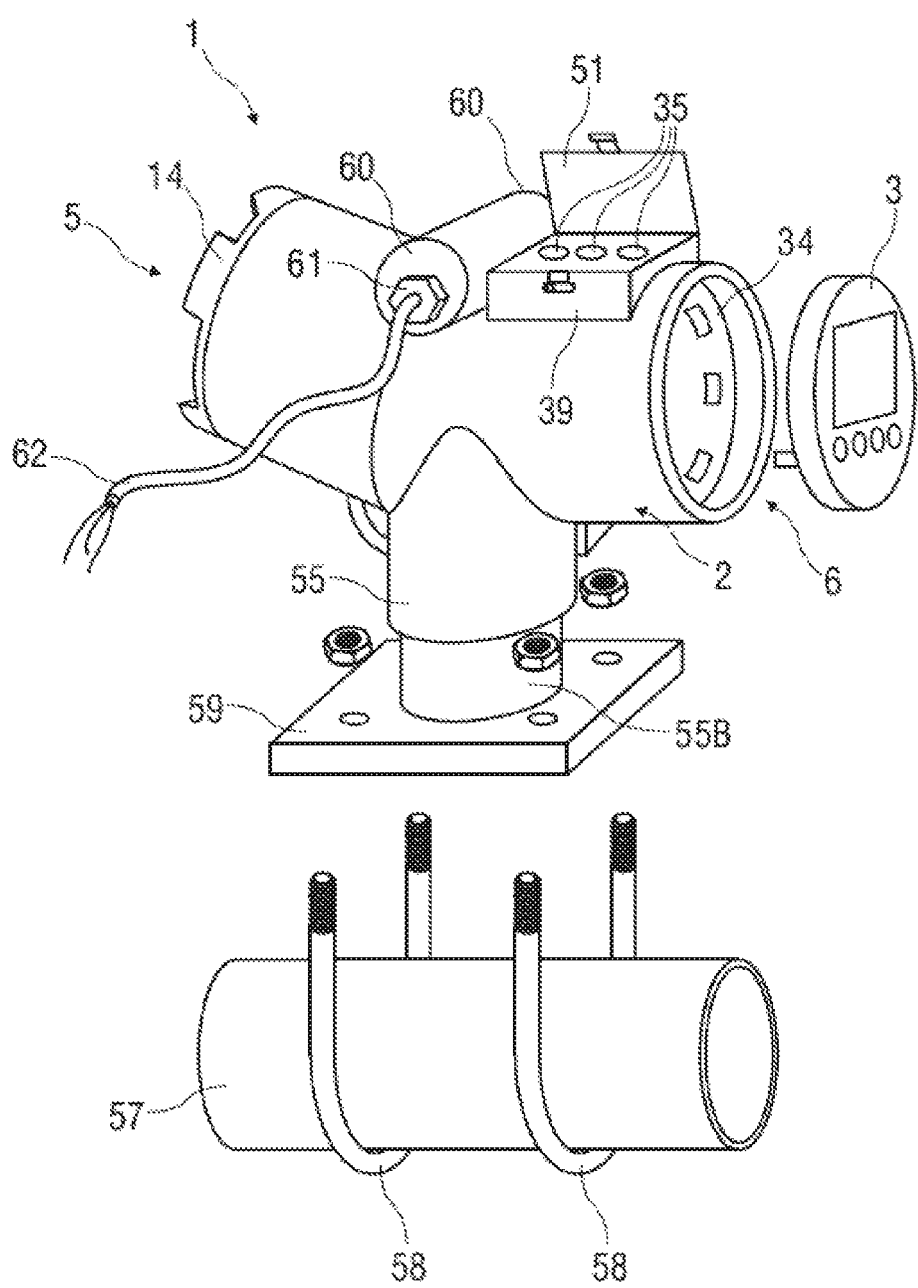
FIG. 5 schematically shows a perspective exploded view of an exemplary embodiment of a measuring device and a section of a pipe.

Shown in FIG. 5 is a perspective exploded view of another exemplary embodiment of a measuring device 1 and a section of a pipe 57.

The measuring device 1 here has no sensor 41 and is implemented as an indicator unit. The measuring device 1 includes a plate 59 and two brackets 58 for attachment to the pipe 57.

On a top of the housing 2 of the measuring device 1, two cable entry openings 60 are located opposite one another in a plane. Cables 62 of the display unit 3 and/or of the terminal unit 4 can be fed through these cable entry openings 60. A threaded cable seal 61 is provided on each cable entry opening 60 for sealing against the environment.

In exemplary embodiments that are not shown in detail, the cable entry openings 60 with the threaded cable seals 61 are located in a lower region of the housing 2, so that cables 62 reach the display unit 3 and the terminal unit 4 from below. The danger of water ingress is thus minimized.

Figure 6:
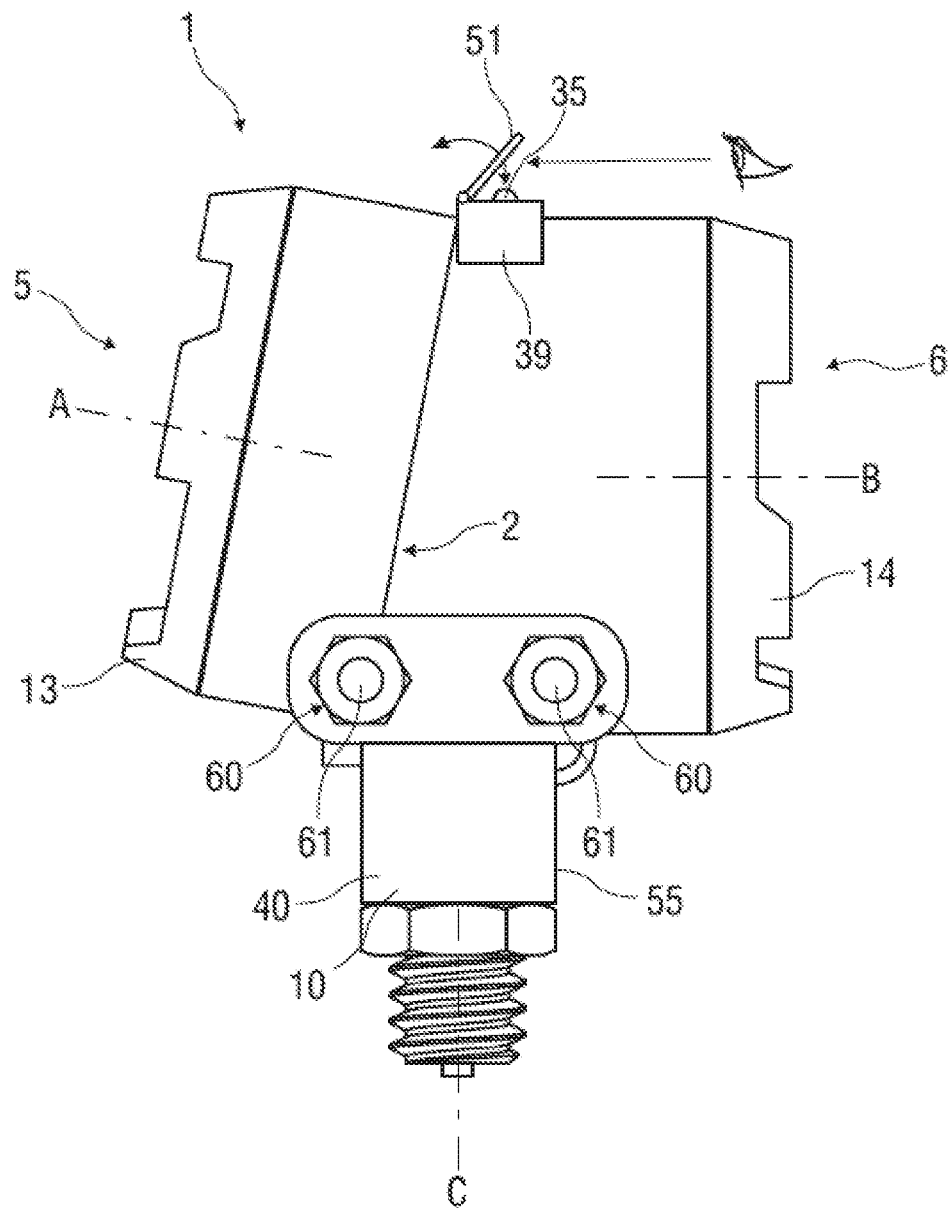
FIG. 6 schematically shows a side view of an exemplary embodiment of a measuring device.

Also, the cable entry openings 60 according to FIG. 6 with the threaded cable seals 61 can be implemented in duplicate as for the upper arrangement and lie in a plane, wherein each cable entry opening 60 reaches an interior of the housing 2 from a side 5, 6.

According to another potential embodiment, it is possible for the display unit 3 and the transmission unit, for example radio unit, and the terminal unit 4 to be accommodated in at least three different or separate housing compartments 30, 31, 40. Thus, in FIG. 6, the display unit 3 could also be accommodated in the housing compartment 30 on the one side 5, the terminal unit 4 in the housing compartment 31 on the other side 6, and the transmission unit in the upper region instead of the button unit 39. In just the same manner, however, the compartment in which the sensor 41 is located, a part of this housing compartment 40, or any other additional formed compartment for such a module as a third or fourth housing compartment can be used as an additional housing compartment 40.

Figure 7:
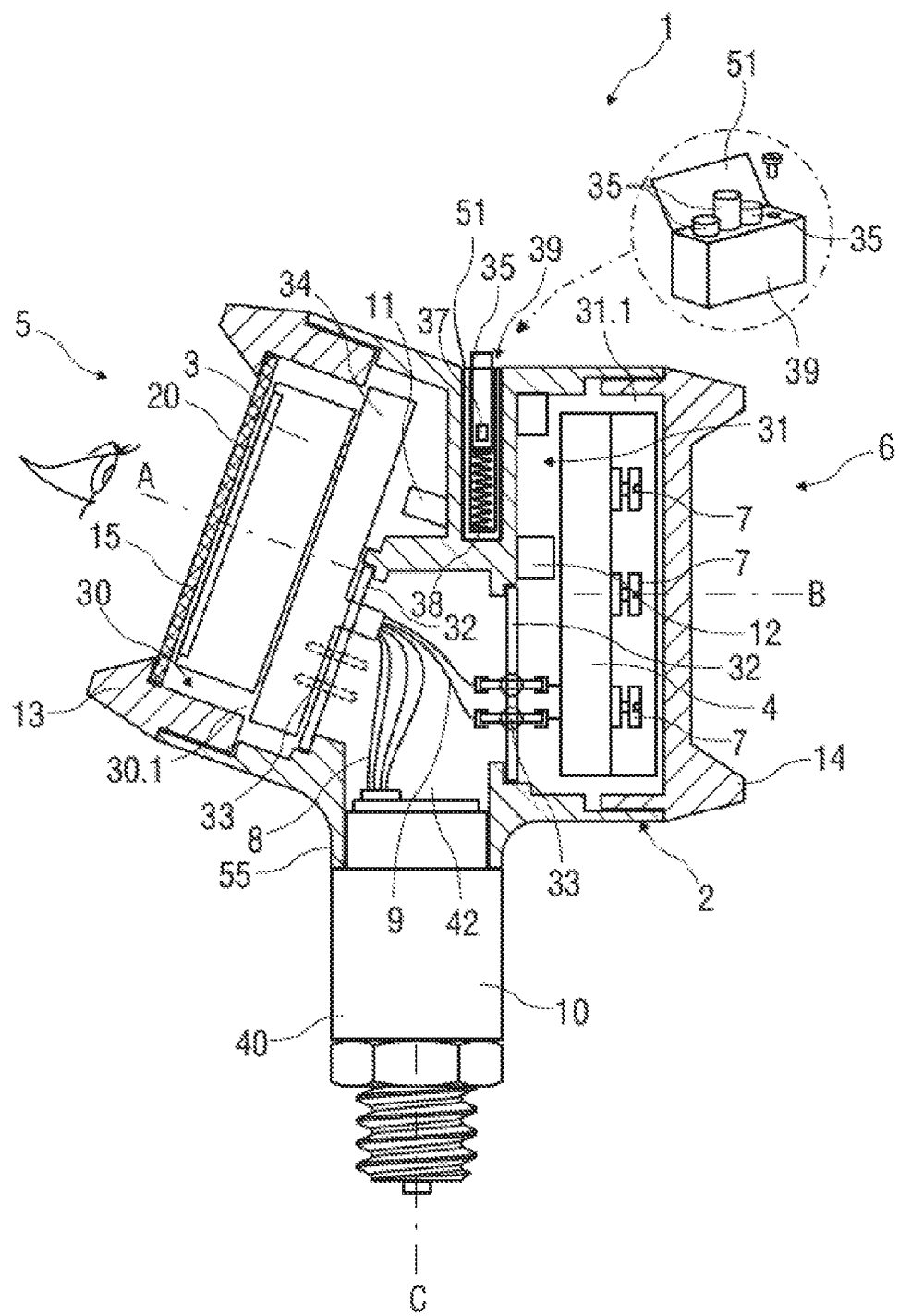
FIG. 7 schematically shows a sectional view of an exemplary embodiment of a measuring device.

FIG. 7 shows a sectional view of another exemplary embodiment of a measuring device 1.

In contrast to the exemplary embodiment shown in FIG. 1, the cap 13 includes a window 15 with a thickness of 2 mm to 15 mm, 3 mm to 11 mm or, for example, 10 mm.

In addition, the cables 8, 9 are combined in a one-piece cable harness and the button unit 39 can be installed, in particular screwed, on the housing 2 as a plastic insert. Depending on the design of the housing 2, this can be along the axes A, B or transverse to them.

The display unit 3 here is two-piece in design and includes an interface to the other housing compartment 31 with the terminal unit 4 as well as an interface to the additional housing compartment 40 with the analysis unit 10 and the sensor 41.

Figure 8:
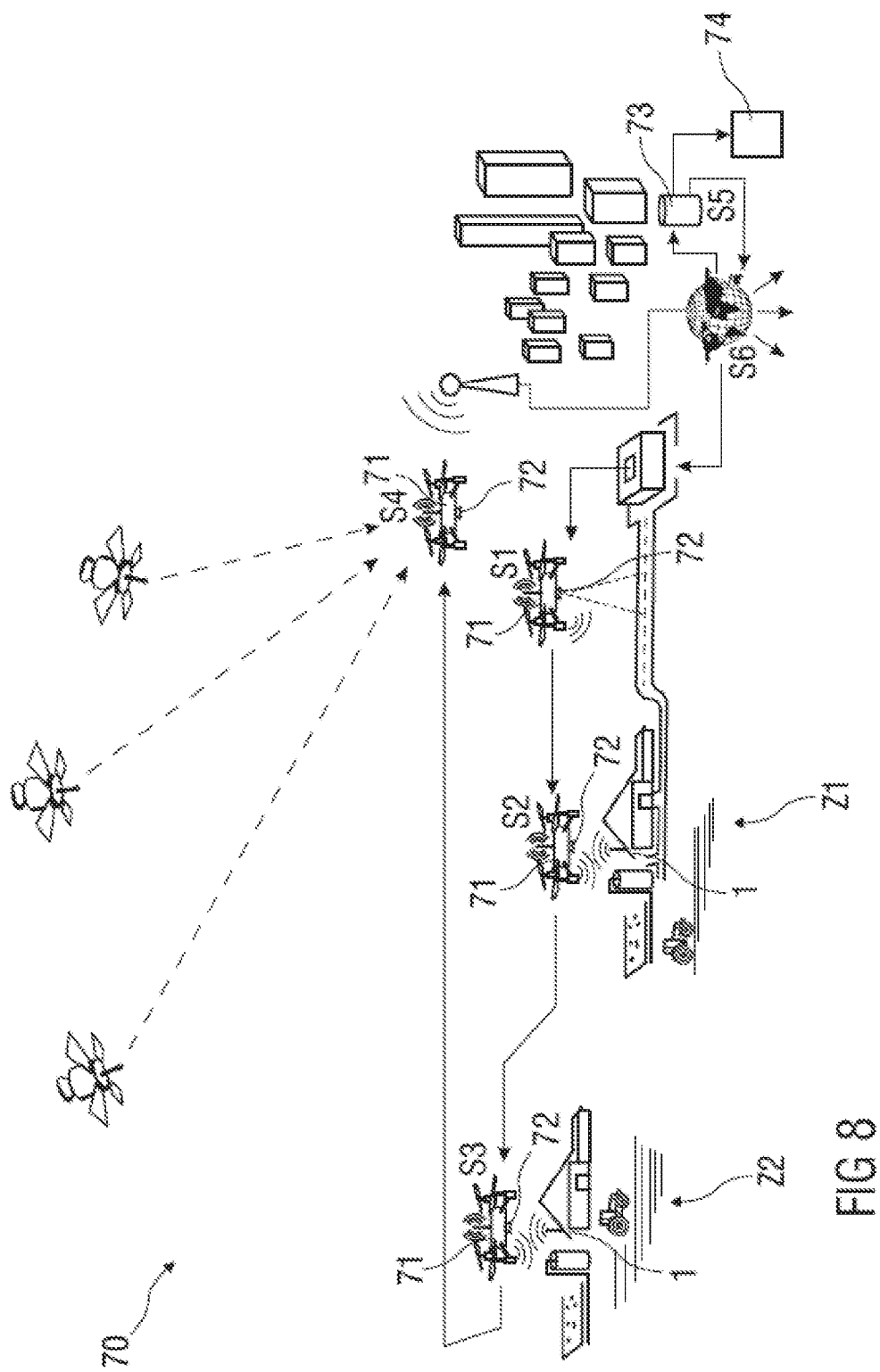
FIG. 8 schematically shows a perspective view of a transmission and analysis system.

In FIG. 8, a perspective view of an airborne transmission and analysis system 70 is shown.

The transmission and analysis system 70 includes at least multiple measuring devices 1 according to one of the exemplary embodiments in FIGS. 1 to 8 and at least one data memory and/or data transmission device 71, wherein the data memory and/or data transmission device 71 is an unmanned aircraft, also called a drone, and includes at least one readout unit 72 for reading out measured values detected by the measuring device 1.

When the data memory and/or data transmission device 71 is designed as an unmanned aircraft, the readout of the measured values can take place fully autonomously or at least under remote control.

In the exemplary embodiment shown of the transmission and analysis system 70, a rise and an oriented approach of the drone to a first destination Z1 that contains a measuring device 1 take place in a first step S1. In so doing, the drone approaches the measuring device 1 with satellite support and/or camera support.

To this end, the drone includes, for example, satellite navigation and a camera system, by means of which an autonomous orientation of the same to environmental data, as for example buildings, roadway markings, are parallel thereto. Moreover, the drone can include so-called direction-finding or direction orientation to stationary ground stations. In this case, an approach to a destination takes place in particular in such a manner that the drone first flies approximately into a destination area using satellite navigation, and once there approaches the destination Z1 with high accuracy by means of camera-assisted navigation and/or direction-finding.

In one possible implementation of the transmission and analysis system, the at least one measuring device 1 transmits a radio signal by means of a transmission unit designed as a radio unit, wherein the data memory and/or data transmission device 71 includes a locating unit for finding the position of the measuring device 1 using the radio signal, and thus the measuring device 1 can be located in a simple and reliable manner. In this embodiment, the approach to the destination Z1 in the first step S1 takes place using the radio signal.

In a second step S2, the drone wirelessly receives data of the measuring device 1 in a temporary memory and/or provides data from this memory to the measuring device 1.

In one possible implementation of the transmission and analysis system 70, the drone activates a data transmission from the measuring device 1 to the drone in order to read out the measurement data of the measuring device 1 by generating an energy field and/or using wireless communication. Alternatively, by emitting acoustic signals, optical signals, haptic signals, actuating a button, and/or initiating the reaching or the crossing of the stored threshold value, the drone causes the activation of the illumination of the display 20 of the measuring device 1 and reads the measured values by means of the camera system. The measured values received or read out here are stored in a memory unit belonging to the drone at least until they have been transmitted to an appropriate receiver.

According to one possible improvement of the transmission and analysis system 70, the at least one drone is designed such that it can charge an energy storage device of a measuring device 1. Charging of this nature takes place, for example, through buildup of an energy field, for example with the use of magnetic induction.

In a third step S3, the drone approaches additional destinations Z2 with measuring devices 1 and wirelessly receives data from the measuring devices 1 in its temporary memory as in step S2 and/or provides data from this memory as in step S2 to the measuring devices 1. Charging of an energy storage device of a measuring device 1 as in step S2 can also be carried out by the drone.

In another possible implementation of the transmission and analysis system 70, this system includes a central computing unit 73, for example a so-called back end server, wherein the central computing unit 73 is connected through a wireless communication connection to the drone.

A data exchange between the central computing unit 73 and the drone takes place through this communication connection in a fourth step S4. The measured values of the at least one measuring device 1 are transmitted by this drone to the central computing unit 73. In addition, the following take place: a transmission and an exchange of messages, a pickup of objects by the drone, a transmission of messages for the next approach of the drone to the destinations Z1, Z2.

In one possible improvement of the transmission and analysis system 70, the central computing unit 73 is coupled through an additional communication connection with at least one terminal device 74, for example a mobile terminal device such as a smartphone or tablet computer or a stationary terminal device, wherein the at least one terminal device 74 retrieves the measured values detected by the measuring device 1 from the central computing unit 73 through the additional communication connection in a step S5.

In addition, a transmission of data from the central computing unit 73 for processing on another server can take place in step S5, and in a step S6 for a representation in databases and Web pages on the Internet.

Figure 9:
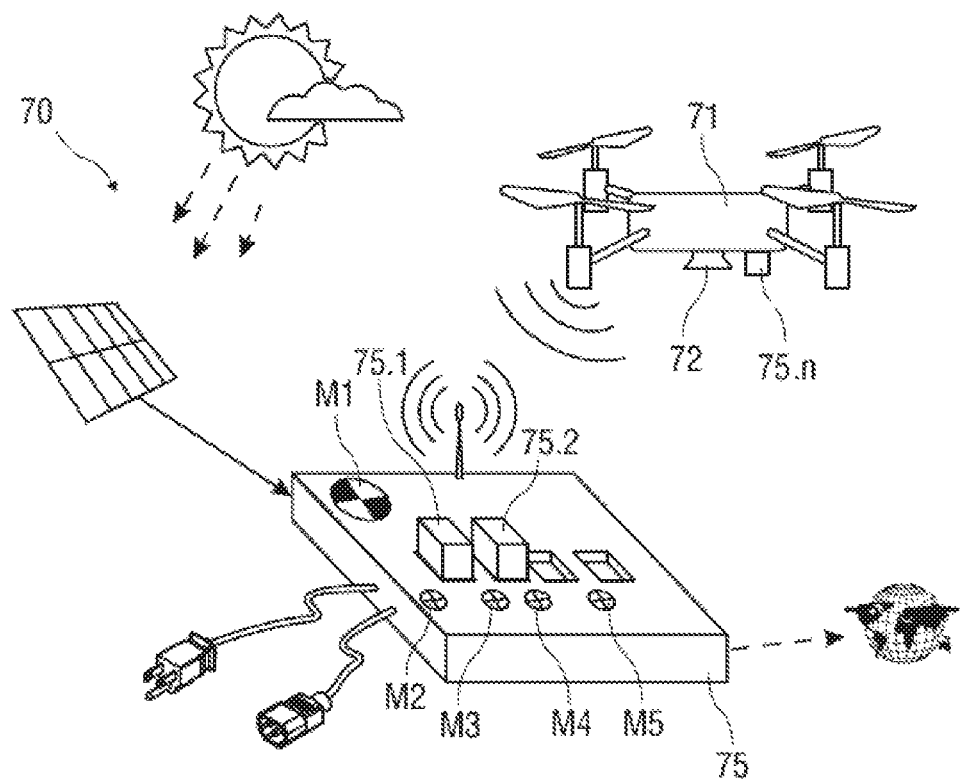
FIG. 9 schematically shows a perspective view of a section of the transmission and analysis system in the area of a charging station.

FIG. 9 shows a perspective view of a section of the transmission and analysis system 70 in the area of a charging station 75.

To increase the range of the drone, the transmission and analysis system 70 includes a multiplicity of energy storage devices 75.1 to 75.*n*, wherein the drone approaches a storage location of the energy storage devices 75.1 to 75.*n* and picks up and/or drops off at least one energy storage device 75.1 to 75.*n*.

For example, the charging stations 75 of the energy storage devices 75.1 to 75.*n* are powered by means of renewable energy, for instance using photovoltaic systems, and/or through an energy grid, for example a public power grid.

In particular, the charging station 75 has approach orientation markings M1 to M5, with the aid of which the drone can approach the charging station 75 and the energy storage devices 75.1 to 75.*n* very precisely. At the charging station 75, the drone is assigned, for example, a full energy storage device 75.1 to 75.*n* and a charging position for charging a discharged energy storage device 75.1 to 75.*n* and/or a deposit location for an energy storage device 75.1 to 75.*n* that is already at least partially emptied.

At the same time, the charging station 75 can serve for intermediate transmission over the Internet of data recorded by means of the drone.

Figure 10:
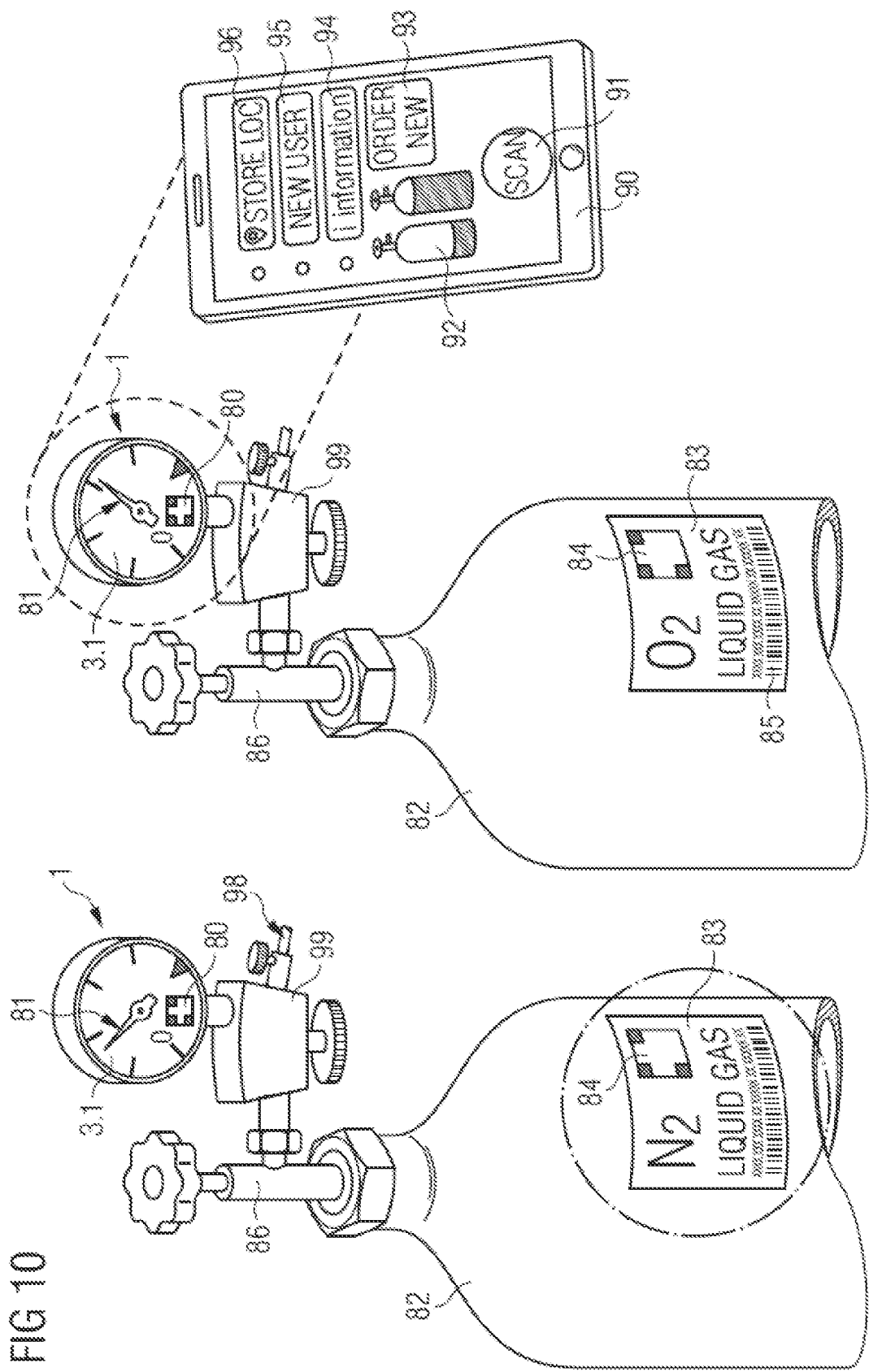
FIG. 10 schematically shows a perspective view of an example application.

FIG. 10 is a perspective view of an application of the measuring device 1 according to the invention on gas cylinders 82. For this purpose, the measuring device 1 is, for example, the pressure gauge as an attachment to a pressure regulator 99 or a discharge unit with valve 98, which is coupled in a pressure-tight manner to a discharge valve 86 of a gas cylinder, cylinder 82. For this purpose, the measuring device 1 is preferably also a dual chamber design as described above, wherein one compartment preferably is filled with a fluid such as, e.g., glycerol, in order to damp vibrations, for example in the case of collision or tipping over of the cylinder, since otherwise the sensor system or an internally installed measurement element could suffer damage.

The indicator 3.1 can be implemented here as a dial with a pointer, or as a display in an OLED or dot matrix design. The pointer can be, in particular, motor-driven or driven by a mechanism. In this design, the signal pass-through from the other chamber into the chamber of the indicator is realized either by electrical, electronic, inductive, or capacitive components, or through an isolation transformer or optical coupling element. It is likewise possible that a mechanical transmission of rotation through the wall is realized through a sealed axle or by means of a magnetic follower drive, wherein at least one magnet in each case is mounted on the end of an axle for this purpose, and the field passes through the partition in each case. It is likewise possible, however, that an AMR sensor, GMR sensor, Hall sensor, or other sensor also converts the rotation signal into an electronic signal, which is then displayed on the display. The value is displayed digitally as a number or by means of an animated pointer. As part of the display, of the dial, or of the window, or on an edge of the window or of the housing, there is provided a readable marking 80 that contains a functionality by means of graphic elements, as is known from bar codes, QR codes, and other codes.

As part of the display or the indicator 3.1, this code can, in particular, be changeable and combine different functionalities with one another. For instance, this can contain a maximum pressure value or a current pressure value that can be read out with a portable minicomputer, terminal device, or smartphone 90. In particular, an application program on the smartphone 90 can also, by means of the camera, simultaneously detect the marking 80 and a pointer position of the pointer 81 and thus, with reference to an end marking, preferably in the form of a large triangle, or by referencing the marking 80 to the pointer 81, evaluate a final pressure and, coupled herewith, display a fill level.

Users can interact with the smartphone 90 through defined, touch-sensitive areas on the screen, hereinbelow called control buttons or buttons. Since a smartphone 90 is often equipped with GPS localization, a location of the measuring device 1 can additionally be determined and stored with each scan, wherein the position finding and the position-finding data as well as the fill level preferably are also made available on a server for other terminal devices and analyses.

This can also be started manually through the control button or "scan" button 91 as part of an initial set-up. During this process, characteristics such as gas type, fill volume, manufacturer and filler and owner of the gas cylinder 82 can be recorded as well. To this end, graphic markings 84 and 85 on the adhesive label 83 of the cylinder 82 can be read in or manually entered. In like manner, by means of a button 95, users of the cylinder can be established, detected, and administered on the measuring device or on a server application. It is also possible that the measuring device 1 with a coupling to the pressure regulator or reducer 99, discharge valve 98, only releases gas when an authorized user identifies himself by means of a coupling through his smartphone 90.

With this data, it is thus possible to detect who used how much gas when, with which cylinder, and where. If a shock sensor is housed in the measuring device, then it is also possible to detect where a cylinder may have suffered possible damage, and whether the cylinder needs to be examined. An automated logging can take place for this purpose, wherein it is also possible to automatically remind about pending refills or returns. In particular, the cylinder data can be stored linked to the data of the measuring device, so that the location with fill level can be computed for every cylinder and transmitted to a server. In addition, ad hoc requests for a refill can be initiated through the application program with a control button or button 93, wherein a message to a filler is then triggered. Alternatively, it is possible to call up safety data sheets or other information through a button 94, where video tutorials on using the cylinder 82, the regulator 99, or the measuring device 1 are also conceivable. Moreover, a display of the fill status of the cylinder 82 through the indicator element 92 is also possible.

In addition, it is possible that users of the smartphone 90 can digitally store the position of the gas cylinder 82 by means of the button 96. Moreover, it is possible that the measuring device 1 is equipped with NFC, LoRa, short-range radio technology, or passive radio technology, or RFID so that an automatic detection and transmission of data is also possible when suitable intelligent devices or drones approach the cylinder 82 together with measuring device 1. In particular, a position finding and optimal supply, refilling of the cylinders is possible in this way, for example on large construction sites and other industrial applications.

In particular, the data record or parts thereof are also transmitted to the measuring device 1 for this purpose so that a history of the location processes and movements of the cylinder can be read out at any time. This preferably is also displayed as a graphical profile of movement on a map or a map section on the display of the measuring device, just as this is possible on the smartphone 90.

The aforementioned shock sensor or position sensor can also activate still other functionalities in the device. For instance, it is also possible for the display to be entirely colored as a warning (red, for example), which can on the one hand be digitally triggered and triggered with the switching-on of blinking lamps, LEDs, but on the other hand can also be realized through a rupture of a dye cartridge. Furthermore, it is possible that tinted fire retardant foam is discharged or blown out as a warning or safeguard, which can bring about a variety of protective effects. This is especially true when sensitive energy storage devices are used, flammable lithium batteries in the measuring device.

Furthermore, it is also possible, however, that such a unit as an optional module or plug-in module or attachment to such a device is not only mounted so as to be exchangeable, but also is arranged to be automatically detachable. Thus, it is possible that this sealed unit in or on the measuring device detaches itself or is actively detached in the event of overpressure or other malfunction, or if the gas cylinder tips over. In any case, however, a collision or another event can be recorded with a time stamp in an error memory, and be read out on request. In particular, such memories are optionally read-only, and cannot be changed or manipulated after the fact. Location information is optionally stored together with the event. Based on the location information and other stored data, a user can then be determined, and the event is preferably stored in a database.

Furthermore, it is also possible that lamps or a display illumination or LED elements are triggered by a remote control, for example through a mobile terminal device, so that it can be visually located by a user. This can also serve to ensure that a configuration or manipulation of a measuring device is always carried out on the correct device. A position finding or an access method can also be supported by acoustic signals.

Figure 11:
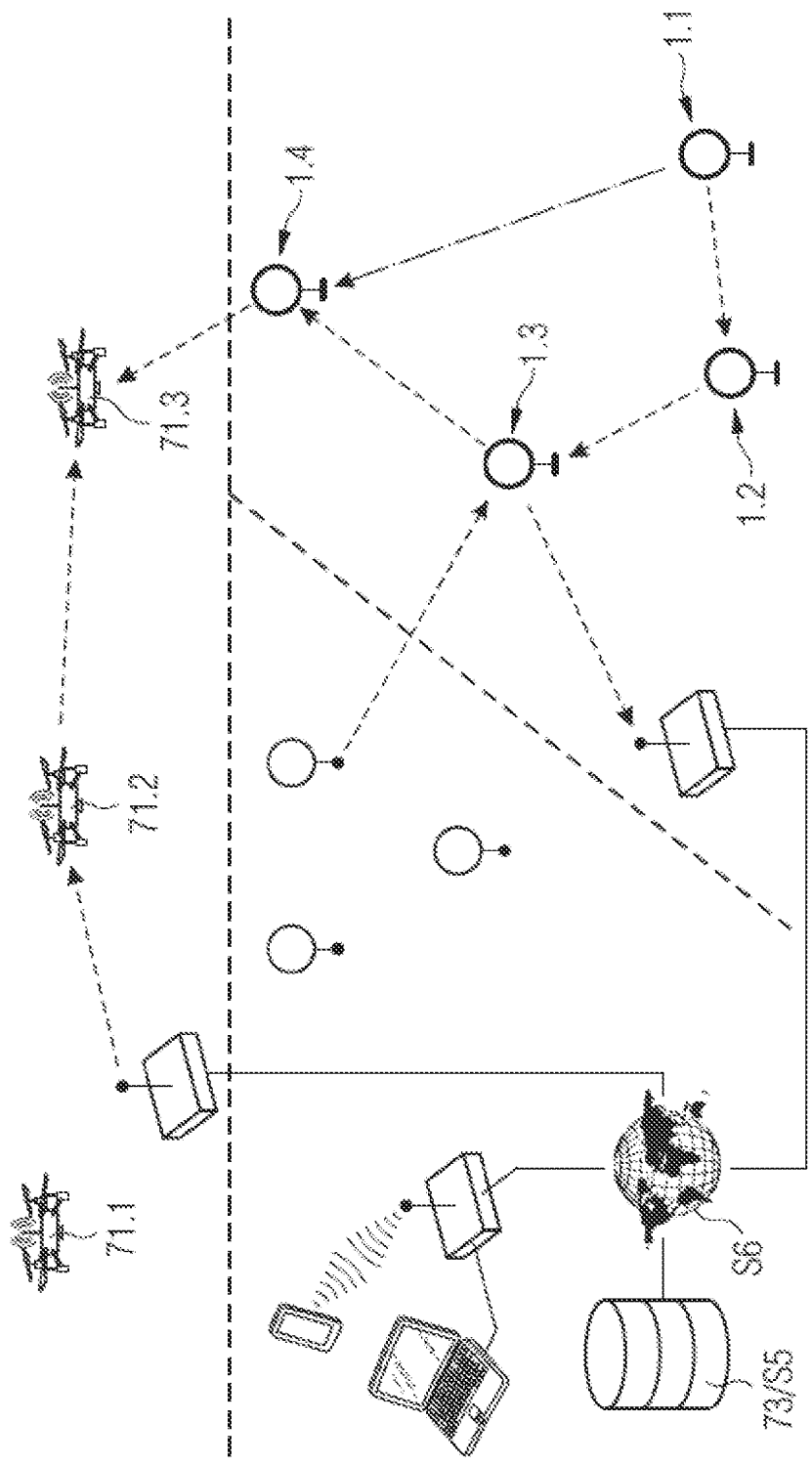
FIG. 11 schematically shows a representation of possible network functionalities of one or a plurality of measuring devices.

Shown in FIG. 11 is a network functionality of the measuring device or of a plurality of measuring devices (1.1-1.4) or of the measurement system.

When the transmission unit is designed as a radio unit, a transmission of the data takes place, for example, such that the data is sent on the basis of electromagnetic waves by means of an antenna and is detected and/or relayed by the antenna of a receiver. This receiver can be, for example, a router, another measuring device, a drone (71.1-71.3), or a transmission unit of another sensor, or even a gateway. The antenna here can also be installed internally in the housing, if the housing is made of plastic. All receivers are also transmitters in this case, and are uniquely identifiably by means of an address.

The size of the distance between individual receivers can be determined by the sending of test data packets and, in particular, by a precise time measurement or measurement of the signal strength. On the basis of this data, a table of the optimal transmitter and receiver pairs can be constructed. This can be used when transmitting a message to ensure that the message is always sent over the path with the greatest signal strength. To this end, a table preferably stored in a server 73/S5 has distances or signal strengths of all devices relative to one another, and calculates a locating matrix herefrom. In doing so, it is possible to determine on the one hand whether a network connection always takes place on the shortest, most reliable path, for example the sending of a message from device 1.1 to 1.4 through stations 1.2 and 1.3, or whether the message should preferably always be sent directly and the above-described path should only represent a fallback solution when the connection becomes weaker or a device moves out of the network/reception range. In particular, a loss of a connection to a participant can be monitored with a watchdog function, and in the event the connection is lost a position finding and a reconnection attempt can be triggered through the launch/approach of an autonomously flying drone.

In this process, the drone orients itself in its approach to the device that last had contact. It is equally possible that the autonomously or manually controlled drone is itself equipped with measurement technology and takes on tasks upon automatic request. Thus, a measuring device 1 could report a pressure loss in an extinguishing system or in an insulated tank, or a drop below a setpoint value over a period of time. If this occurs, the drone could potentially undertake leak detection with a suitable sensor system and detect leaks by means of IR, laser, acoustic, or other sensor systems.

The signals sent by the radio unit of the measuring device 1 usually contain a data header for this purpose, which contain, e.g., information about the receiver of the data, but likewise also data on the application on which the measuring device is installed. This information can be used by the receiver of the signals to trigger suitable actions when alarm thresholds are reached.

The invention is not limited to the preceding detailed exemplary embodiments. It can be modified within the scope of the following claims.

In like manner, individual aspects from the dependent claims may be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A housing for a measuring device for accommodating at least one transmission unit for transmitting data and/or a display unit for displaying data and a terminal unit provided for supplying electric power to the measuring device, the housing comprising:
   at least two housing compartments, wherein the transmission unit and/or the display unit and the terminal unit are each arranged in different housing compartments, and
   axes of the housing compartments being formed in each case by a surface normal of an outward facing housing opening of each of the housing compartments or axes being formed in each case by a surface normal of a cap closing a housing opening of each of the housing compartments, cross one another,
   wherein the at least two housing compartments each include fastening elements for fastening the transmission unit and/or the display unit and the terminal unit, the fastening elements in the at least two housing compartments being of identical design,
   wherein the at least two housing compartments are coupled to a base having a lower housing region,
   wherein a cable assembly extends from the lower housing region to the at least two housing compartments,
   wherein the cable assembly is connectable to each of the transmission unit and/or the display unit and the terminal unit, and
   wherein due to the fastening elements being of identical design and the cable assembly being connectable to each of the transmission unit and/or the display unit and the terminal unit, the transmission unit and/or the display unit and the terminal unit are interchangeably mountable on each of the at least two housing compartments.

2. The housing according to claim 1, wherein the crossing of the axes is 20° to 50°.

3. The housing according to claim 1, wherein the at least two housing compartments are separated from one another by at least one partition or separator.

4. The housing according to claim 1, wherein at least one of the caps includes a window with a thickness of at least 5 mm.

5. The housing according to claim 1, wherein the base is provided for measuring device mounting, and wherein the at least two housing compartments are rotatable through at least 260° about the base.

6. The housing according to claim 1, wherein the cable assembly includes at least two cables being of identical design.

7. The housing according to claim 1, further comprising at least two connection openings and/or at least two cable entry openings.

8. The housing according to claim 7, wherein the at least two connection openings and/or the at least two cable entry openings are each located in the lower housing region.

9. The housing according to claim 8, wherein the at least two connection openings and/or the at least two cable entry openings are in one plane.

10. A measuring device according to claim 1, the measuring device comprising:
    a housing according to claim 1;
    the display unit and/or the transmission unit for sending and/or receiving a signal; and
    the terminal unit,
    wherein the transmission unit and/or the display unit and the terminal unit are each arranged in different housing compartments.

11. The measuring device according to claim 10, further comprising at least one sensor for detecting a pressure, a temperature, a density, and/or a fill level.

12. The measuring device according to claim 10, further comprising at least one button unit that is adapted to be arranged outside the housing, wherein the button unit comprises:
    multiple buttons with integrated magnets, and
    a stroke operation of a button adapted to be transmitted to the display unit or to an assembly associated with the display unit via a shifted magnetic field.

13. The measuring device according to claim 10, wherein the display unit further comprises an illuminated display, wherein an activation of the illumination occurs automatically upon detection of acoustic signals, optical signals, haptic signals, actuation of a button, and/or a reaching or a crossing of a stored threshold value.

14. The measuring device according to claim 10, wherein an optoelectronically readable text is implemented on an outward-facing surface of the housing and/or of at least one of the caps, and wherein the optoelectronically readable text includes an address for creating a data connection to a data memory from which measured values detected by the measuring device are be retrieved.

15. A transmission and analysis system comprising:
at least one measuring device according to claim 10; and
at least one data memory and/or data transmission device,
wherein the data memory and/or data transmission device is a mobile terminal device or an unmanned aircraft and includes at least one readout unit for reading out measured values detected by the measuring device.

16. The transmission and analysis system according to claim 15, wherein the at least one measuring device transmits a signal via a transmission unit and
wherein the data memory and/or data transmission device includes a locating unit for position finding of the measuring device using the signal.

17. The transmission and analysis system according to claim 15, further comprising a central computing unit, wherein the central computing unit is connected through a wireless communication connection to the data memory and/or data transmission device, wherein an exchange of data takes place over the communication connection between the central computing unit and the data memory and/or data transmission device, and wherein measured values detected by the measuring device are read out and transmitted to the central computing unit via data memory and/or data transmission device.

18. The transmission and analysis system according to claim 17, wherein the central computing unit is coupled over an additional communication connection with at least one terminal device, and wherein the at least one terminal device retrieves the measured values detected by the measuring device from the central computing unit through the additional communication connection.

19. The transmission and analysis system according to claim 15, wherein the data memory and/or data transmission device includes at least one transmitter unit for transmitting position-finding data through a direct or indirect connection to the at least one measuring device.

20. The transmission and analysis system according to claim 19, wherein the transmission of the position-finding data by the transmitter unit to the at least one measuring device takes place as a function of a distance between the data memory and/or data transmission device when a distance falls below a predetermined threshold value.

21. The transmission and analysis system according to claim 19, wherein the data memory and/or data transmission device generates and/or transmits position-finding data on a manual request or based on an automatic algorithm.

22. A housing for a measuring device for accommodating a transmission unit for transmitting data and/or display unit for displaying data and a terminal unit provided for supplying electric power to the measuring device, the housing comprising:
at least two housing compartments, wherein the transmission unit and/or the display unit and the terminal unit are each arranged in different housing compartments, and
axes of orientations of the housing compartments that cross one another,
wherein the at least two housing compartments each include fastening elements for fastening the transmission unit and/or the display unit and the terminal unit, the fastening elements in the at least two housing compartments being of identical design,
wherein the at least two housing compartments are coupled to a base having a lower housing region,
wherein a cable assembly extends from the lower housing region to the at least two housing compartments,
wherein the cable assembly is connectable to each of the transmission unit and/or the display unit and the terminal unit, and
wherein due to the fastening elements being of identical design and the cable assembly being connectable to each of the transmission unit and/or the display unit and the terminal unit, the transmission unit and/or the display unit and the terminal unit are interchangeably mountable on each of the at least two housing compartments.

* * * * *